Feb. 29, 1944. C. LEWIS 2,343,015
CINEMATOGRAPHIC CAMERA
Filed Dec. 20, 1941 2 Sheets-Sheet 1
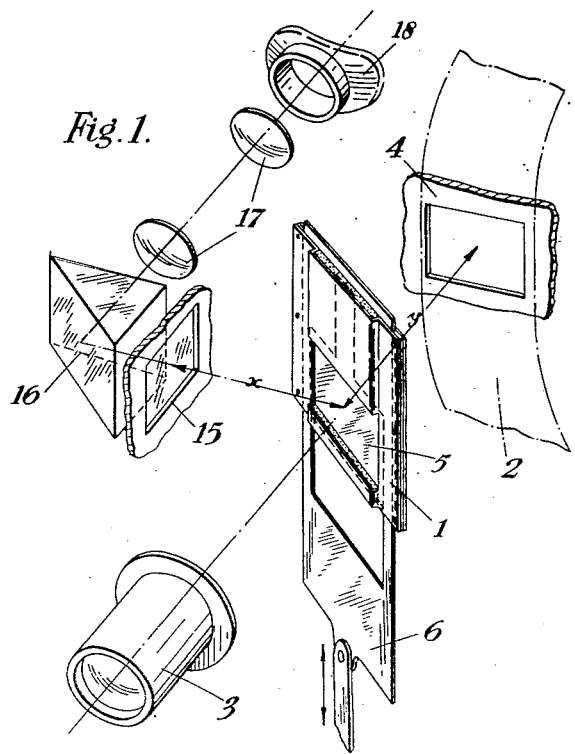
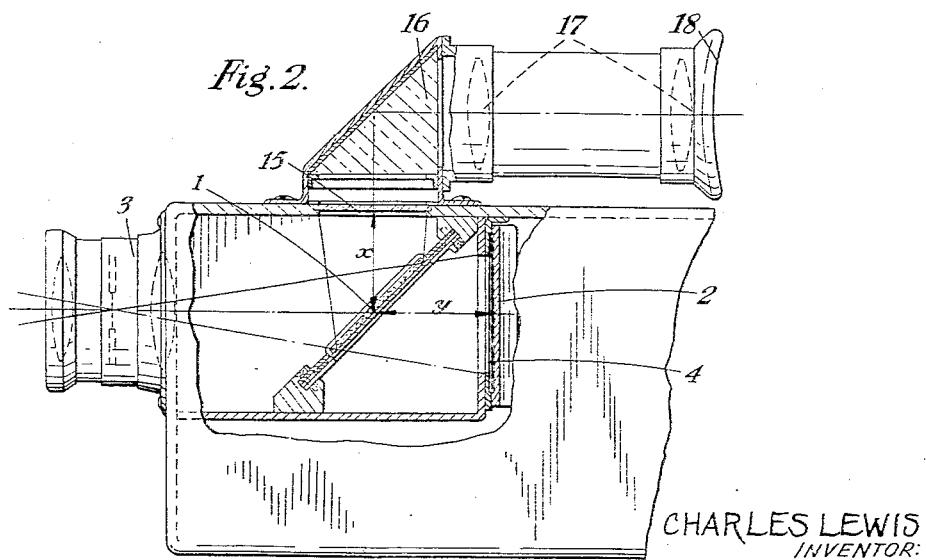
CHARLES LEWIS
INVENTOR:
BY Haseltine Lake & Co.
ATTORNEYS Feb. 29, 1944.                C. LEWIS                2,343,015
                        CINEMATOGRAPHIC CAMERA
                        Filed Dec. 20, 1941            2 Sheets-Sheet 2
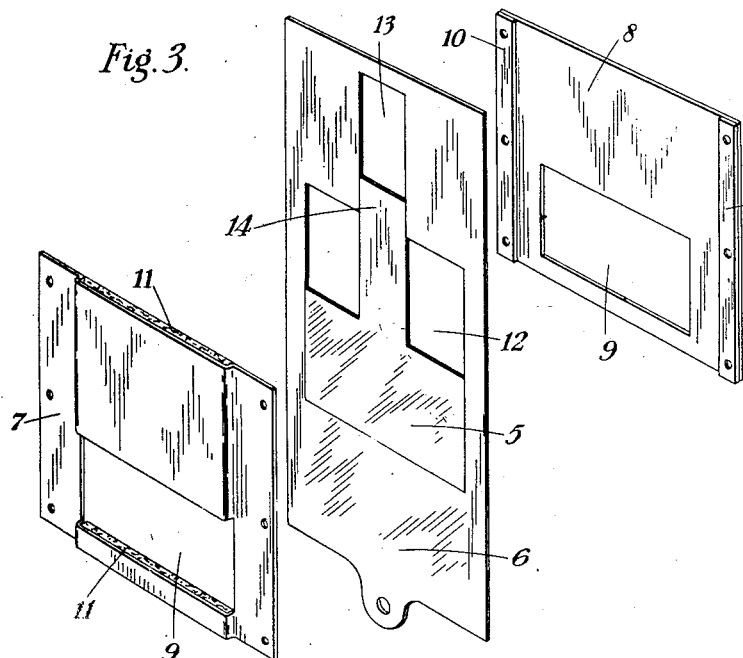
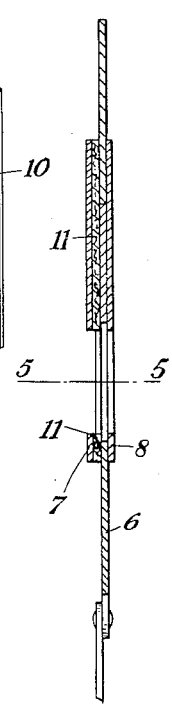
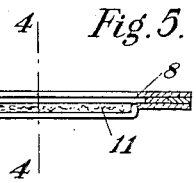
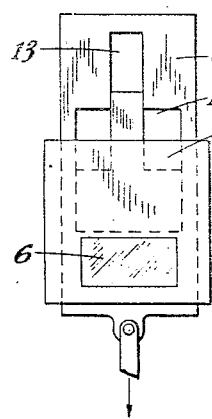
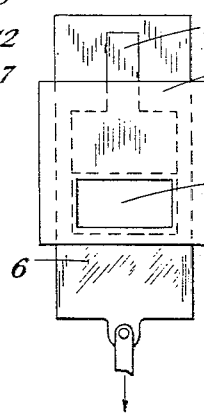
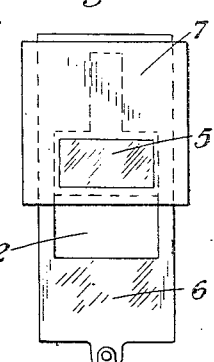
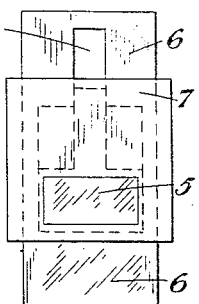
CHARLES LEWIS INVENTOR:
BY
Haseltine, Lake & Co.
ATTORNEYS.

Patented Feb. 29, 1944

2,343,015

UNITED STATES PATENT OFFICE 2,343,015

CINEMATOGRAPHIC CAMERA

Charles Lewis, London, England

Application December 20, 1941, Serial No. 423,708
In Great Britain January 9, 1941

2 Claims. (Cl. 88—16)

This invention relates to cinematographic cameras of the kind incorporating a shutter of the reciprocating-plate type, the chief object of the invention being to provide with this type of camera viewing mechanism which will enable the objective lens to be used for viewing purposes whilst the camera is in operation whereby direct optical vision and true perspective of the scene being photographed may be obtained and horizontal and vertical parallax avoided. With the viewing mechanism constructed in accordance with the invention the effects produced, for example, by the use of long and short focus, telephoto and other objective lenses, or by filters, and increase or decrease of iris aperture or the like can be observed whilst the camera is actually in operation.

According to the present invention, in a cinematographic camera of the kind set forth the reciprocating-plate shutter is provided with a reflecting surface on its forward face, i. e., the face nearest the objective lens, the shutter being arranged at an angle to the film gate as distinct from the usual parallel arrangement, whereby light rays passing through the objective lens on their way to the film will be reflected from the reflecting surface when the shutter is in its closed position, into a viewing system disposed at the side or other convenient point on the camera. It is preferred that the shutter shall be arranged at an angle of 45° to the plane of the film, the dimensions of the shutter and its associated aperture being proportionately increased in view of its inclined position. The viewing screen on to which the light rays are reflected can either be directly observed or the scenes or objects observed thereon may be viewed through a viewing system including one or more prisms or the like and a combination of lenses. With the above arrangement throughout the cycle of operation of the film-shift mechanism, rays from the objective lens are reflected to the viewing screen and interrupted momentarily by the exposure. In this way the picture as seen on the viewing screen has the maximum amount of light rays from the objective and compares advantageously with that of a picture screened by a projector, in that the property of persistence of vision applies owing to the construction of the shutter, the reflecting member or members of which perform the dual purpose of making the exposure and reflecting the image received thereon from the objective lens on to the viewing screen.

Referring to the drawings—

Figure 1 is a diagrammatic view illustrating one form of shutter and viewing system constructed in accordance with the invention;

Figure 2 is a horizontal sectional view of a cinematographic camera incorporating such a system;

Figure 3 is an exploded perspective view of the shutter parts;

Figure 4 is a vertical section of the shutter on the line 4—4 of Figure 5;

Figure 5 is a transverse horizontal section on the line 5—5 in Figure 4; and

Figures 6 to 9 illustrate the operation of the shutter.

Referring in the first case to Figures 1 and 2, the shutter which is indicated by the reference numeral 1 is arranged at 45° to the plane of the film 2 and is situated at a suitable point between the objective lens 3 and the film gate 4.

The shutter is composed of four principal parts which are shown clearly in Figure 3, the shutter comprising sliding members 5 and 6 which form the shutter proper and which are accommodated in a casing consisting of a front plate 7 and back plate 8, each having a rectangular aperture 9 the area of which is increased in view of the inclined arrangement of the shutter. The parts 7 and 8 are adapted to be spaced the required distance apart by strips 10 constituting guides situated at the sides, the front plate 7 being formed with recesses arranged above and below the aperture, said recesses being adapted to receive pressure pads 11 for a purpose hereinafter referred to.

The inner member 5 of the shutter proper is adapted to slide shuttle-fashion within an aperture cut in the outer member 6, the aperture comprising a rectangular part 12 and an upward extension 13 in which a tail part 14 of the inner member 5 slides. The design of the members 5 and 6, movement of the inner member being effected by the outer member, is such that their reflecting portions are in one plane, the parts 5 and 6, over an area slightly larger than the aperture 9 being polished to each provide a highly reflecting surface.

By means of the pads in the front plate a uniform but unretarding pressure is maintained on both inner and outer members 5 and 6, ensuring a smooth contact with the back plate, whereby a true reflection of the objective rays is obtained, since the reflecting portions alternately come to rest at, or withdraw from, the aperture in the shutter casing.

The operation of the shutter is shown clearly in Figures 6 to 9. In Figure 6 the shutter is in its initial closed position, the polished reflecting surface of the outer member 6 being visible in the aperture. In Figure 7 the shutter has been drawn downwardly into its open position, the aperture being uncovered leaving the member 5 held suspended above by means of the upper pad 11. In Figure 8 the shutter has been moved still further downwards into its closed position in which position the reflecting surface of the member 5 appears in the aperture. In Figure 9 the shutter has commenced its upward movement, the member 5 however having been left in the position shown in Figure 8 again as a result of the pressure exerted on the member 5 by the pads 11. As will be observed from Figures 7 and 8, the inner member 5 is drawn downwardly by the member 6 when the latter has reached the position shown in Figure 7 and, during upward movement of the shutter from the position shown in Figure 9 to that shown in Figure 6, the inner member is moved upwardly by the outer member until it once again assumes the position shown in Figure 6. It will, therefore, be apparent that except during the actual instant of exposure one or other of the reflecting surfaces is situated in the aperture and the property of persistence of vision prevents such interruption affecting in any way the image observed on the viewing screen. Any suitable or usual mechanism may be employed for operating the shutter.

The viewing system shown includes a viewing screen 15 (see Figures 1 and 2), a right prism 16, lenses 17, and an eyepiece 18, the light rays passing through the objective lens 3, being reflected from the reflecting surfaces of the parts 5 and 6 (whichever surface is opposite the aperture), on to the screen 15 and thence into the prism 16, the light rays thence passing through the lenses 17 and eyepiece 18 to the eye of the observer. Alternatively, the viewing screen may be so arranged that it can be directly observed.

Such a viewing system in addition to being used for composing the picture and judging the correct exposure can be used for focussing purposes and as an aid to accurate focussing the viewing screen may be ruled with one or more hair lines. To enable the viewing screen to be used for focussing purposes the shutter is so arranged relatively to the viewing screen and film that the distance $x$ representing the distance separating the reflecting surfaces from the viewing screen is equal to the distance $y$ representing the distance separating the reflecting surfaces from the film (see Figures 1 and 2), the shutter being arranged at 45° to the film and viewing screen.

What I claim and desire to secure by Letters Patent of the United States is:

1. In a cinematographic camera having an optical objective and a film gate axially alined therewith the combination of a reciprocating two plate shutter arranged at an angle to the film gate and comprising a fixed outer casing having an aperture for the passage of light rays from the objective lens to the film, two reciprocable plate members forming the shutter proper slidably mounted within said casing and disposed both in the same plane, each of said plate members being formed with a reflecting surface on its forward face, one plate member being formed with an opening within which opening the other plate member is contained, the length of said opening being greater than the length of the inner plate member to permit of initial endwise movement of said outer plate member in both directions without corresponding movement of said inner plate member and thus provide when moved in the one direction a light slit between said inner and outer plate members opposite said aperture, but to cause subsequently said inner plate member to be moved into a position in which it lies opposite said aperture and during movement in the other direction to permit of said inner plate member remaining in a position in which it lies opposite said aperture until said inner and outer plate members abut and said inner plate member is thus caused to partake of movement of said outer plate member, means for imparting reciprocating movement to said outer plate member in both directions, and a viewing system, so positioned relative to said shutter that light rays passing through the objective lens on their way to the film will be reflected to said viewing system from the surface of either of said plate members when disposed opposite said aperture.

2. In a cinematographic camera having an optical objective and a film gate axially alined therewith the combination of a reciprocating two plate shutter arranged at an angle to the film gate and comprising a fixed outer casing having an aperture for the passage of light rays from the objective lens to the film two reciprocable plate members forming the shutter proper slidably mounted in said casing and disposed both in the same plane each of said plate members being formed with a reflecting surface on its forward face, one plate member being formed with an opening within which opening the other plate member is contained, the length of said opening being greater than the length of the inner plate member to permit of initial movement of said outer plate member in both directions of movement without corresponding movement of said inner plate member and thus provide when moved in the one direction a light slit between said inner and outer plate members opposite said aperture but to cause subsequently said inner plate member to be moved into a position in which it lies opposite said aperture and during movement in the other direction to permit of said inner plate member remaining in position opposite said aperture until the two plate members abut and said inner plate member is thus caused to partake of movement of said outer plate member, pads located within said casing in frictional engagement with said inner plate member to maintain said inner plate member in position until moved positively under the action of said outer plate member, means for imparting reciprocating movement to said outer plate member in both directions of movement and a viewing system so positioned relative to said shutter that light rays passing through the objective lens on their way to the film will be reflected to said viewing system from the reflecting surface of either of the inner and outer plate members when disposed opposite said aperture.

CHARLES LEWIS.